US006829649B1

(12) United States Patent
Shorey et al.

(10) Patent No.: US 6,829,649 B1
(45) Date of Patent: Dec. 7, 2004

(54) METHOD AN CONGESTION CONTROL SYSTEM TO ALLOCATE BANDWIDTH OF A LINK TO DATAFLOWS

(75) Inventors: Rajev Shorey, New Delhi (IN); Huzur Saran, New Delhi (IN); Abhinav Kamra, Noida (IN); Sundeep Kapila, Jamnagar (IN); Varun Khurana, Noida (IN); Vikas Yadav, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 783 days.

(21) Appl. No.: 09/710,163

(22) Filed: Nov. 10, 2000

(51) Int. Cl.[7] ............................................. G06F 15/16
(52) U.S. Cl. ........................................................ 709/235
(58) Field of Search ................................ 709/223, 224, 709/225, 226, 232, 234, 233, 235; 719/311; 370/391, 232, 412, 394, 230, 468

(56) References Cited

U.S. PATENT DOCUMENTS

| | | | | |
|---|---|---|---|---|
| 5,592,476 A | * | 1/1997 | Calamvokis et al. | 370/390 |
| 5,689,508 A | * | 11/1997 | Lyles | 370/391 |
| 5,831,971 A | * | 11/1998 | Bonomi et al. | 370/230 |
| 5,835,711 A | * | 11/1998 | Chang et al. | 709/232 |
| 6,088,360 A | * | 7/2000 | Amaral et al. | 370/412 |
| 6,118,791 A | * | 9/2000 | Fichou et al. | 370/468 |
| 6,157,654 A | * | 12/2000 | Davis | 370/412 |
| 6,356,565 B1 | * | 3/2002 | Bouyer et al. | 370/468 |
| 6,389,031 B1 | * | 5/2002 | Chao et al. | 370/412 |
| 6,396,834 B1 | * | 5/2002 | Bonomi et al. | 370/394 |
| 6,522,628 B1 | * | 2/2003 | Patel et al. | 370/230.1 |

OTHER PUBLICATIONS

Stanwood et. al. "Method and apparatus for allocating bandwidth in a wireless communication system", US Publication 2001/0038620, Nov. 8, 2001.*

Katz, "Bandwidth and path allocation method for a switched fabric connecting multiple multimedia buses", US Publication 2002/0018477, Feb. 14, 2002.*

Garcia et al. "Method of maintaining reservation state . . . ", US Publication No. 2002/0097726, Jul. 25, 2002.*

Floyd, S., Jacobson V., "Random Early Detection Gateways for Congestion Avoidance", IEEE/ACM Transactions on Networking, vol. 1, No. 4, Aug. 1993, P. 397–413.

Lin, D., Morris, R., "Dynamics of Random Early Detection", Proceedings of SIGCOMM '97, Cannes, France.

Anjum, F.M., Tassiulas, L., "Balanced–RED: An Algorithm to achieve Fairness in the Internet", Mar. 8, 1999, Centre for Satellite and Hybrid Communication Networks, University of Maryland.

Suter, B. Lakshman, T.V., Stiliadis, D., Choudhury A., "Efficient Active Queue Management for Internet Routers", 1998, Bell Labs, Holmdel, NJ 07733.

(List continued on next page.)

Primary Examiner—John Follansbee
Assistant Examiner—Haresh Patel
(74) Attorney, Agent, or Firm—McGinn & Gibb, PLLC; T. Rao Coca, Esq.

(57) ABSTRACT

A method, a system and a computer program product are disclosed for allocating bandwidth of a limited bandwidth link to dataflows containing packets. In the method, the number of buckets is adaptively adjusted dependent upon the number of active dataflows. Each bucket has a number of tokens allocated to the bucket for use by the corresponding dataflow. The number of tokens is dependent upon a weighted value for the corresponding dataflow. Queueing of the packets for utilization of the limited bandwidth link is dependent upon the tokens. Tokens are then adaptively-reallocated to one or more buckets in accordance with a weighted value for each of the dataflows.

36 Claims, 13 Drawing Sheets

OTHER PUBLICATIONS

Keshav, S., "An Engineering Approach to Computer Networking: ATM Network, the Internet and the Telephone Network", Addison–Wesley, 1997, pp. 445–492.

Floyd, S., "TCP and Explicit Congestion Notification", Lawrence Berkeley Laboratory, Computer Communications Review, 24(5), Oct. 1994.

Hashem, E., "Analysis of random drop for gateway congestion control", MIT/LCS/TR–465, Cambridge, 1989.

Suter, B., Laksham T.V., Stiliadis, D., and Choudhury A., "Design Considerations for Supporting TCP with pre–flow Queueing", In Proc. IEEE INFOCOM, San Francisco, Apr. 1998.

Jacobson, V. and Karels M.J., "Congestion Avoidance and Control", Aug. 1998, In Proc IEEE SIGCOMM '88, Standford, CA.

Hahne, E. and Gallager, R., "Round Robin Scheduling for Fair Flow Control in Data Communications Networks", In IEEE International Conference on Communications, Jun. 1986.

Floyd, S. and Jacobson V., "On Traffic Phase Effects in Packet Switched Gateways", Computer Communication Review, Apr. 1991.

Zhang, H., Shenker, S. and Stoica, I., "Core–Stateless Fair Queueing: Achieving Approximately Fair Bandwidth Allocations in High Speed Networks", Aug. 28, 1998, In Proc. IEEE SIGCOMM '98.

\* cited by examiner

METHOD AN CONGESTION CONTROL SYSTEM TO ALLOCATE BANDWIDTH OF A LINK TO DATAFLOWS

FIELD OF THE INVENTION

The present invention relates generally to the field of congestion control in communication networks and more specifically to congestion control of dataflows at Internet gateways.

BACKGROUND

Numerous dataflows may pass through Internet gateways of fixed outgoing bandwidth at any given time. The dataflows may cumulatively require data to be sent at a rate which could be considerably less or more than the available bandwidth, resulting in a fluctuating load at a gateway. Consequently, congestion control is necessary to ensure good bandwidth utilization and low queue occupancy at the gateway. An additional advantage of congestion control is that certain dataflows are protected against bandwidth monopolisation by other more dominant and aggressive dataflows.

Internet traffic may broadly be classified into two categories, namely adaptive and non-adaptive traffic. Adaptive, or responsive, connections have built-in congestion control mechanisms which reduce the flow rate on detection of congestion. Transport layer protocols, like Transport Control Protocol (TCP) are used by adaptive connections to implement a congestion avoidance mechanism. In the Internet, dropped packets are considered an indication and measure of network congestion. Accordingly, TCP senders adjust the rate at which data is sent in accordance with the number of packets dropped in the network.

On the other hand, non-adaptive connections do not implement any congestion control mechanisms. In other words, non-adaptive applications do not attempt to assess congestion in the network and adapt accordingly. While adaptive connections reduce flow rates upon detecting congestion, non-adaptive flows, such as User Datagram Protocol (UDP) and Constant Bit Rate (CBR), do not reduce flow rate and consequently contribute to increased congestion. As a result, adaptive connections are disadvantaged by the more aggressive non-adaptive connections which monopolise more than a fair share of the fixed available bandwidth. This gives rise to heavily congested networks characterised by large numbers of dropped packets and leads to a large proportion of wasted traffic.

Since application sources cannot be relied upon to co-operate in congestion control, mechanisms must be provided to implement congestion control and equitable bandwidth allocation from within the network, preferably by providing an incentive for applications to employ end-to-end congestion control. Such mechanisms can only be employed at the Internet gateways, as it is there that the different flows interact. Furthermore, the mechanisms should be easy to implement at the hardware level as the volume of traffic at gateways is extremely large and the available processing time per packet is extremely limited.

A number of approaches to queue management at gateways have been studied. Providing a gateway keeps a separate queue for each dataflow, Round-Robin Scheduling (RRS) can be used to ensure fair distribution of bandwidth amongst the dataflows. This further provides an incentive for adaptive applications. Another approach is for a gateway to provide Explicit Congestion Notification to sources (ECN). Although such systems ensure improved allocation and utilization of bandwidth, implementation is more difficult as a separate queue for each flow is required to be maintained by the gateway.

Droptail gateways are currently employed almost universally in the Internet. A droptail gateway drops arriving packets when the gateway buffer is full. While simple to implement, this technique tends to arbitrarily distribute losses among the dataflows and also tends to penalize bursty connections.

Early Random Drop (ERD) and Random Early Detection (RED) are methodologies that address some of the drawbacks of droptail gateways. These techniques employ randomization of dropped packets and early detection of congestion, based on buffer usage, to avoid congestion and buffer overflow. Accordingly, these are primarily techniques of congestion avoidance as opposed to congestion control. Whilst these techniques exhibit many advantages over droptail gateways, fair allocation of bandwidth amongst dataflows is still not ensured. Specifically, Random Early Detection (RED) drops packets of a dataflow in proportion to the current occupancy of the queue by that dataflow. This does not always lead to a fair allocation of bandwidth.

To ensure fairer allocation of bandwidth amongst dataflows and to identify and penalize misbehaving sources, some sort of status indication must be maintained for each individual dataflow. Many approaches based on per-flow queuing have been suggested. In Longest Queue Drop (LQD), whenever the buffer is full, a packet from the dataflow with the greatest number of packets in the queue is dropped. Other similar algorithms, such as Approximated Longest Queue Drop (ALQD) and random LQD (RND) have been proposed. However, these algorithms are complex to implement, may cause frequent buffer overflows, and act as congestion control mechanisms rather then congestion avoidance mechanisms.

Yet another approach is that of per-flow accounting whilst maintaining a single queue. Flow Random Early Drop (FRED) incorporates changes to the RED algorithm and attempts to penalize misbehaving dataflows by the use of a 'strike' variable. This is achieved by imposing minimum and maximum limits on the number of packets a dataflow can have in the queue. However, through simulation FRED has been shown to fail to ensure fair allocation of bandwidth in many instances. Furthermore, FRED requires a relatively high level of implementation complexity and is not considered to be easily extendible to provide differentiated services.

Thus, a need clearly insists for a method and a system for allocating bandwidth to dataflows that substantially overcomes or at least ameliorates one or more deficiencies of existing arrangements.

SUMMARY

An aspect of the present invention provides a method of allocating bandwidth of a limited bandwidth link to dataflows containing packets. The method includes adaptively adjusting the number of buckets dependent upon the number of active dataflows, where each bucket has a number of allocated tokens for use by a corresponding dataflow. The number of tokens allocated is dependent upon a weighted value for the corresponding dataflow and queuing of packets for utilization of the limited bandwidth link is dependent upon the tokens in the corresponding bucket. Tokens are adaptively reallocated to one or more buckets according to a weighted value for each of the dataflows.

Another aspect of the present invention provides a system for allocating bandwidth of a limited bandwidth link to dataflows containing packets. The system includes means for adaptively adjusting the number of buckets dependent upon the number of active dataflows, where each bucket has a number of allocated tokens for use by a corresponding dataflow. The number of tokens allocated is dependent upon a weighted value for the corresponding dataflow, and queuing of packets for utilization of the limited bandwidth link is dependent upon the tokens in the corresponding bucket. Tokens are adaptively reallocated to one or more buckets according to a weighted value for each of the dataflows.

A further aspect of the present invention provides a computer program product including a computer readable medium with a computer program recorded therein for allocating bandwidth of a limited bandwidth link to dataflows containing packets. The computer product includes program code for adaptively adjusting the number of buckets dependent upon the number of active dataflows, where each bucket has a number of allocated tokens for use by a corresponding dataflow. The number of tokens allocated is dependent upon a weighted value for the corresponding dataflow, and queuing of packets for utilization of the limited bandwidth link is dependent upon the tokens in the a corresponding bucket. Tokens are adaptively reallocated to one or more buckets according to a weighted value for each of the dataflows.

BRIEF DESCRIPTION OF THE DRAWINGS

Embodiments of the invention are described hereinafter with reference to the drawings, in which.

DETAILED DESCRIPTION

A method, a system and a computer program product are described for allocating bandwidth to dataflows. In the following, numerous specific details are set forth including buffer sizes, for example. However, it will be apparent, in view of this disclosure, that modifications and other changes can be made without departing from the scope and spirit of the invention. In other instances, well known features have not been described in detail so as not to obscure the invention.

Figure 1:
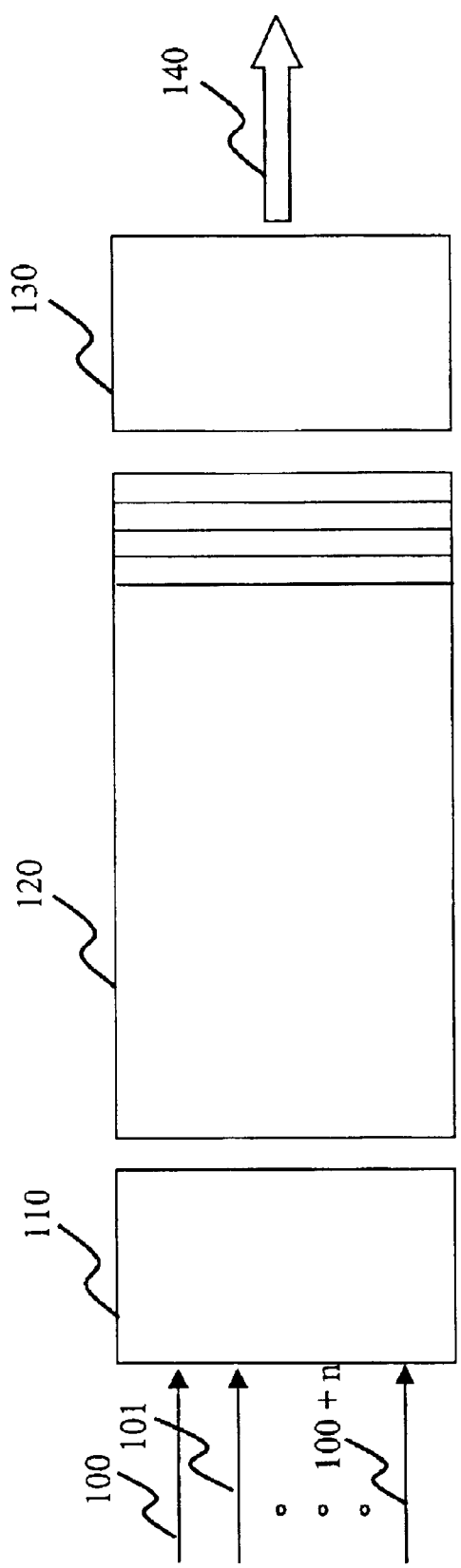
FIG. 1 is a block diagram illustrating a typical Internet gateway.

FIG. 1 shows a typical Internet gateway, with which the embodiments of the invention can be practiced. The gateway has an outgoing link 140 of fixed capacity C bytes per second (Bps), a queue buffer 120 of size B bytes, and numerous incoming dataflows 100, 101 . . . φ+n that bring in data packets to be transmitted through the outgoing link 140. The queue management discipline 110, at the input side of the queue 120, determines which packets are to be admitted to the queue 120 or dropped. The queue management discipline 110 may also mark the packets to indicate congestion at the gateway. Packets are retrieved from the queue 120 for sending across the outgoing link 140 in accordance with a strategy performed by the scheduling discipline 130.

Figure 2:
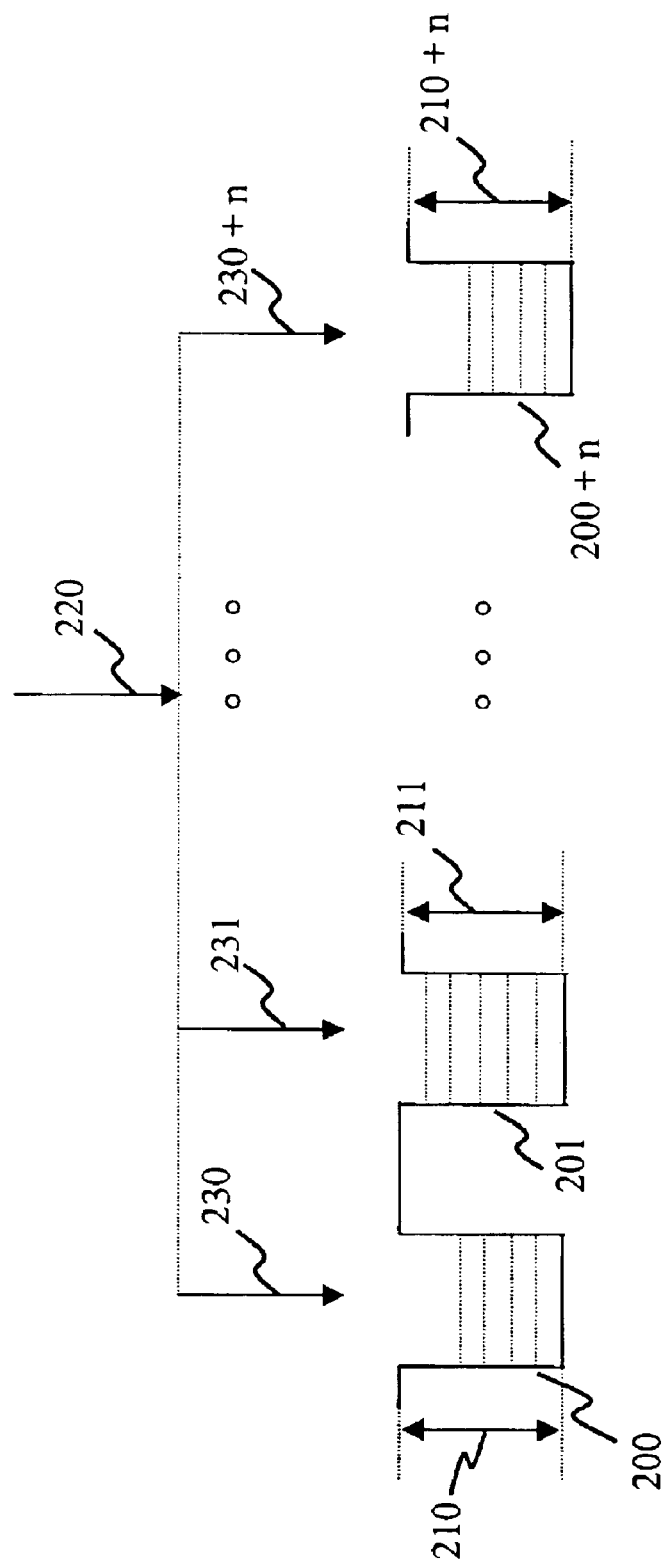
FIG. 2 is a schematic diagram illustrating an architecture for implementation of the Selective Fair Early Detection (SFED) methodology in accordance with the embodiments of the invention.

FIG. 2 illustrates a methodology in accordance with the embodiments of the invention for active queue management in Internet gateways called Selective Fair Early Detection (SFED). SFED maintains a minimal history of per-flow status, is relatively easy to implement in hardware, and provides the advantages of congestion avoidance, fair bandwidth allocation, high link utilization, and low queue occupancy.

SFED is a rate-based mechanism for allocation of bandwidth to each dataflow in proportion to the allocated weight of the respective dataflow. Referring to FIG. 2, token buckets 200, 201 . . . 200+n are allocated to the incoming dataflows 100, 101 . . . 100+n, respectively. Each of token buckets 200, 201 . . . 200+n is used to maintain a record of past usage of the outgoing link 140 by each of the incoming dataflows 100, 101 . . . 100+n, respectively. The heights 210, 211 . . . 210+n of the respective buckets 200, 201 . . . 200+n are proportional to the weights of the respective incoming dataflows 100, 101 . . . 100+n and correspond to the amount of history maintained for each of the incoming dataflows 100, 101 . . . 100+n, respectively. Furthermore, the bucket heights 200, 201 . . . 200+n ensure that no particular incoming flow 100, 101 . . . 100+n over-utilizes the capacity of the outgoing link 140. A lower bound, $H_{min}$, is specified for the height of all buckets.

Since the cumulative height 210+211+ . . . +(210+n) of all the buckets 200, 201 . . . 200+n is conserved, in accordance with the fixed capacity of the outgoing link 140, the addition of a bucket in respect of an additional incoming dataflow acts to decrease the heights 210, 211 . . . 210+n of at least some of the existing buckets 200, 201 . . . 200+n. Similarly, the deletion of an existing bucket has the effect of increasing the heights of at least some of the remaining buckets. The heights 210, 211 . . . 210+n of the buckets 200, 201 . . . 200+n determine the maximum size of bursts, of dataflows 100, 101 . . . 100+n, that can be accommodated respectively. Hence, for the case of a relatively large number of incoming dataflows 100, 101 . . . 100+n, correspondingly smaller bursts of each dataflow 100, 101 . . . 100+n are allowed. This equates to decreasing the heights 210, 211 . . . 210+n of each of the token buckets 200, 201 . . . 200+n, respectively.

The buckets 200, 201 . . . 200+n are filled at rates 230, 231 . . . 230+n that are proportional to the weights allocated to incoming dataflows 100, 101 . . . 100+n such that the cumulative rate 220 corresponds exactly with the capacity of the outgoing link 140. For a typical Internet scenario, the token allocation rates 230, 231 . . . 230+n of the buckets 200, 201 . . . 200+n depend on the class of traffic (due to different weights for different classes of traffic) and the status of each respective incoming dataflow 100, 101 . . . 100+n at any given instant. Thus, due to individually determined token allocation rates 230, 231 . . . 230+n in respect of the the buckets 200, 201 . . . 200+n, it is ensured that the fixed bandwidth of the outgoing link 140 is ensured to distribute amongst the incoming dataflows 100, 101 . . . 100+n, as desired, and any particular dataflow is ensured to not receive an undue advantage.

As a packet of a dataflow 100, 101 . . . 100+n is inserted in the queue 120, for sending across the outgoing link 140, tokens are removed from a corresponding bucket 200, 201 . . . 200+n in accordance with the size of the packet.

According to a generalised algorithm for implementation of the SFED methodology, two events trigger actions at a gateway, namely the arrival of a packet at the gateway and the additional allocation of tokens to buckets 200, 201 . . . 200+n.

Figure 3:
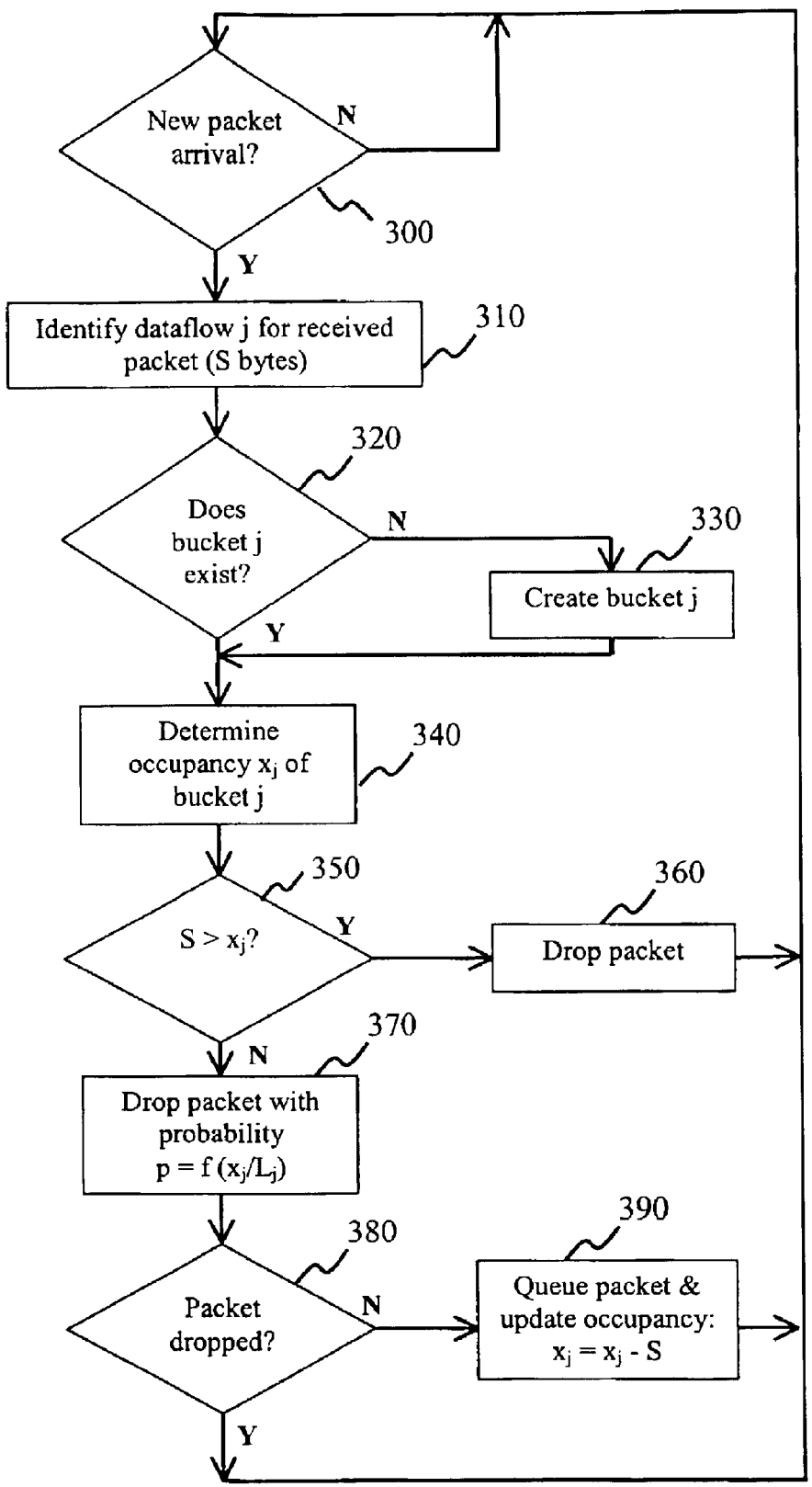
FIG. 3 is a flowchart which illustrates a generalised algorithm for the implementation of the SFED methodology.

The flow chart of FIG. 3 illustrates the events following arrival of a packet at a gateway. Upon arrival of a new packet (Y), at decision step 300, the dataflow j corresponding to the received packet, of size S bytes, is identified, at step 310. Otherwise (N), processing continues at step 300.

A check is then made to determine whether a bucket j, corresponding to identified dataflow j, already exists, at decision step 320. If bucket j does exist (Y), the occupancy $x_j$ of bucket j is determined, at step 340. If bucket j does not exist (N), at decision step 320, bucket j is created, at step 330, before processing proceeds to step 340.

At decision step 350, a check is made to determine whether the size of the received packet (S bytes) is greater than the occupancy $x_j$ of bucket j. If the arrived packet size S is greater than the occupancy $x_j$ of bucket j (Y), the packet is dropped at step 360 and processing reverts to decision step 300. Alternatively, if the size S of the received packet is not greater than the occupancy $x_j$ of bucket j (N), the received packet may be dropped in accordance with a probability $p=f_p$ $(x_j/L_j)$, at step 370, where $x_j$ is the occupancy of bucket j, $L_j$ is the height of bucket j, and $f_p:[0,1] \to [0,1]$. A random real number generator which generates real numbers between zero and one is applied and if the random number so generated is less than a predetermined threshold value, the packet is dropped. Alternatively, the packet is admitted to the queue 120.

In decision step 380, a check is made to determine if a packet was dropped in step 370. If the packet was dropped (Y), processing reverts to decision step 300. Alternatively, if the packet was not dropped (N), at decision step 380, the packet is placed in the queue and a new bucket occupancy $x_j$ is computed by subtracting the queued packet size S from the previous bucket occupancy $x_j$, at step 390. Processing then reverts to decision step 300.

Figure 4:
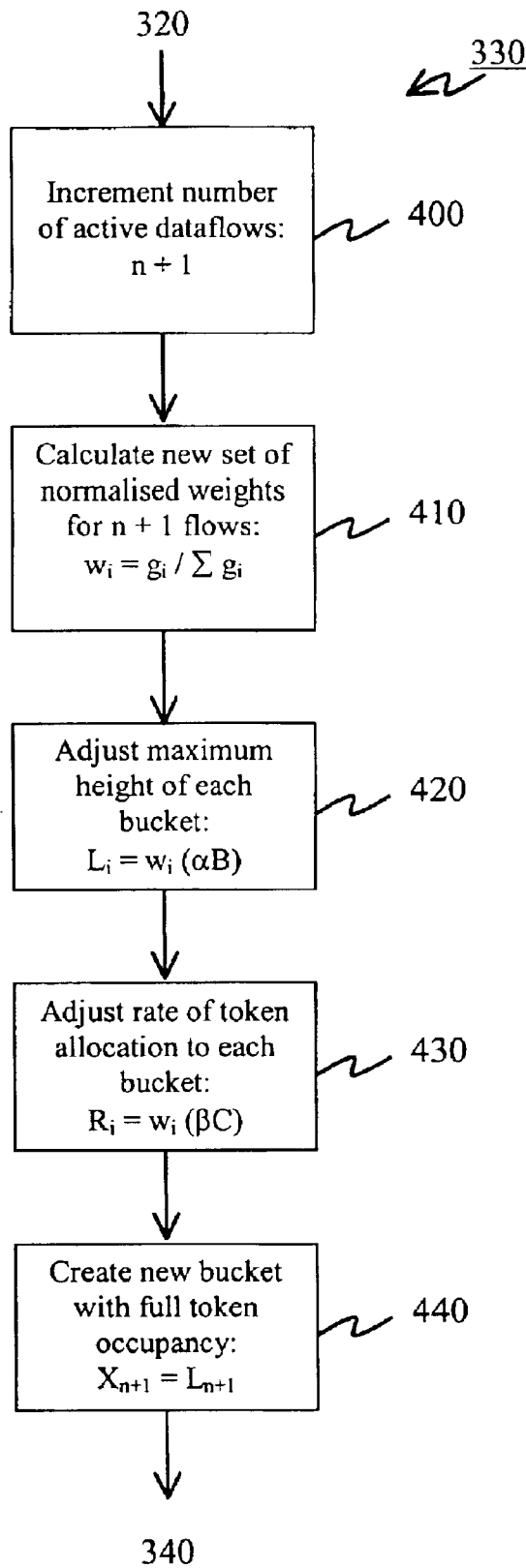
FIG. 4 is a flowchart which illustrates the steps in creation of a new bucket, in accordance with FIG. 3.

FIG. 4 is a flow chart illustrating the steps in creation of a new bucket, as per step 330 of FIG. 3, when a dataflow corresponding to a received packet is identified for which no bucket currently exists. Each new dataflow is ensured to grow by provision of a full bucket of tokens initially. Further the total number of tokens and packets in the system is ensured to remain constant, the total being $T=\alpha B$ which is also equal to the total cumulative size of the buckets, B is the size of the queue buffer in bytes, and $\alpha$ is a method parameter for determination of the total number of tokens and packets in the system ($\alpha > 0$).

The set of weights $\Gamma = \{g_1, g_2 \ldots g_N\}$ represents the weights of the dataflows that pass through the gateway.

Upon receipt of a packet corresponding to a dataflow for which no bucket exists, the number of active connections or incoming dataflows is incremented to n+1, at step 400.

A new set of normalised weights $w_1, w_2 \ldots w_{n+1}$ for the n+1 dataflows is calculated, at step 410, according to the formula $w_i = g_i / \Sigma g_i$, where $g_i$ is the weight for the i-th flow.

At step 420, the height L of each bucket is adjusted according to the formula $L_i = w_i(\alpha B)$, where $L_i$ is the height of the i-th bucket, $w_i$ is the normalised weight of i-th active dataflow, B is the size of the queue buffer is bytes, and $\alpha$ is the method parameter for determination of the total number of tokens in the system.

At step 430, the rate of token allocation to each bucket is adjusted according to the formula $R_i = w_i(\beta C)$, where $R_i$ is the rate at which tokens are added to the i-th bucket, $w_i$ is the normalised weight of the i-th active dataflow, C is the outgoing link bandwidth in bytes per second, and $\beta$ is a method parameter which determines the rate at which tokens are added to the system ($\beta > 0$).

At step 440, a new bucket is created with full token occupancy (ie. $x_{n+1} = L_{n+1}$, where $x_{n+1}$ is the occupancy of new bucket n+1 and $L_{n+1}$ is the height of the new bucket n+1. Processing then reverts to step 340 of FIG. 3.

Figure 5:
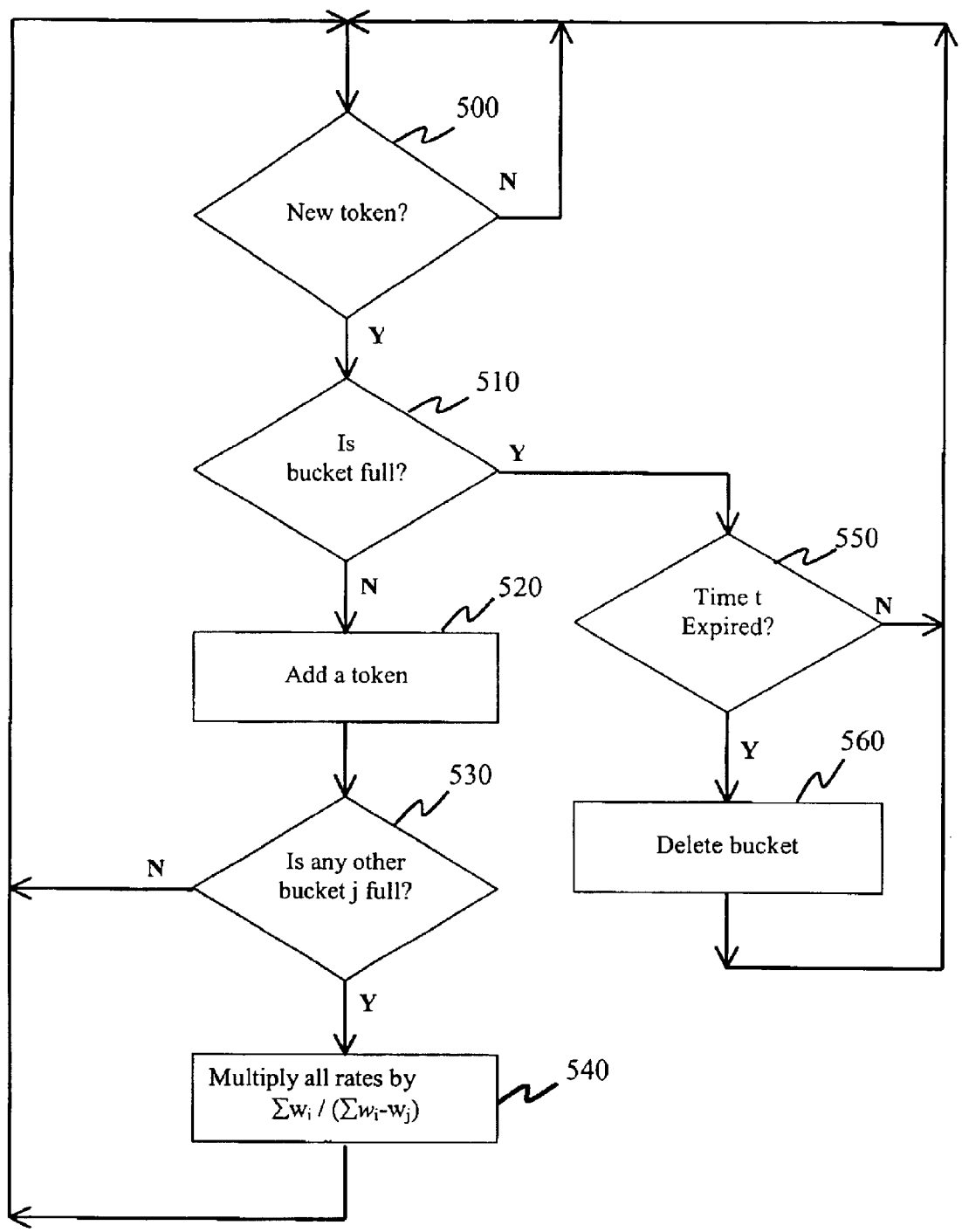
FIG. 5 is a flowchart which illustrates the addition of available tokens to existing buckets in accordance with the embodiments of the invention.

FIG. 5 is a flow chart illustrating the allocation of available tokens to a particular bucket in the system. Tokens are added to a bucket i at a rate $R_i = w_i(\beta C)$, where $w_i$ is the normalised weight of the i-th data flow, C is the outgoing link bandwidth in bytes per second, and $\beta$ is a method parameter which determines the rate at which tokens are added to the system ($\beta > 0$).

Referring to the flow chart of FIG. 5, a check is made at decision step 500 to determine if there is a new token to be allocated. If a new token is to be allocated to a bucket (Y), at decision step 500, processing continues at decision step 510. Otherwise, processing continues at decision step 500. In step 510, a check is made to determine whether the particular bucket is full of tokens. If the particular bucket is not full of tokens (N), at decision step 510, a token is added at step 520.

Then, at decision step 530, a check is made to determine whether any other bucket j is full of tokens. If a bucket j is full of tokens (Y), at decision step 530, the rates at which tokens are added to the buckets of all the other active dataflows are automatically increased by a factor of $\Sigma w_i / (\Sigma w_i - w_j)$, at step 540, due to nomalisation of the weights, where $w_j$ is the normalised weight of the j-th inactive dataflow with a full bucket and $w_i$ is the normalised weight of the i-th active dataflow. Processing then reverts to decision step 500. If the bucket j was not full (N), at decision step 530, processing also reverts to decision step 500.

If the bucket was full of tokens (Y), at decision step 510, a check is made to determine whether a predetermined time T has expired, at decision step 550. If time T has not expired (N), at decision step 550, processing reverts to decision step 500. Alternatively, if time T has expired (Y), at decision step 550, the full bucket is deleted, at step 560, and processing reverts to decision step 500.

Figure 6:
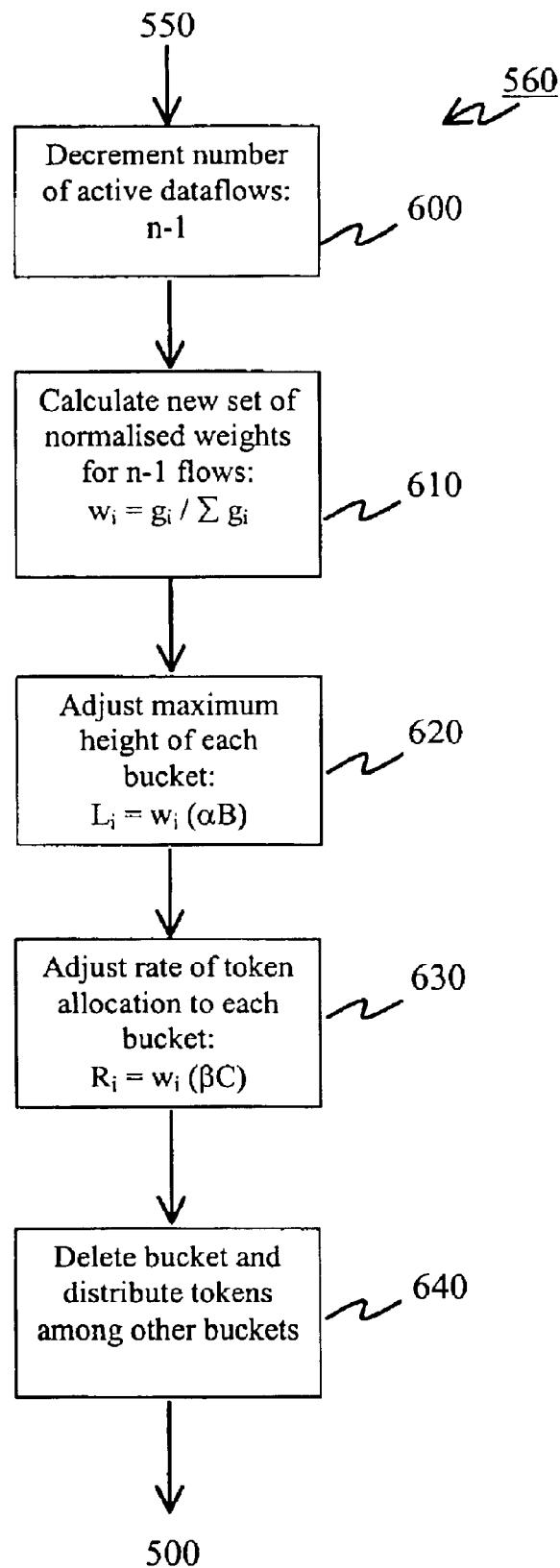
FIG. 6 is a flowchart which illustrates the steps in deletion of a bucket, in accordance with FIG. 5.

FIG. 6 is a flow chart illustrating the steps in deletion of a bucket, as per step 560 of FIG. 5, when a dataflow has remained inactive for a time T. The tokens from the deleted bucket T are distributed among the other remaining buckets. The total number of tokens in the system is ensured to remain constant in accordance with the formula T=$\alpha$B where T is the total number of tokens, B is the size of the queue buffer in bytes, and $\alpha$ is a method parameter for determination of the total number of tokens in the system ($\alpha$>0).

The set of weights $\Gamma=\{g_1, g_2 \ldots g_N\}$ represents the weights of the dataflows that pass through the gateway.

Upon expiry of time T, the number of active connections or incoming dataflows is decremented to n−1, at step 600.

A new set of normalised weights $w_1, w_2 \ldots w_{n-1}$ for the n−1 dataflows is calculated, at step 610, according to the formula $w_i=g_i/\Sigma g_i$, where $g_i$ is the weight for the i-th flow.

At step 620, the maximum height L of each bucket is adjusted according to the formula $L_i=w_i(\alpha B)$, where $L_i$ is the height of the i-th bucket, $w_i$ is the normalised weight of i-th active dataflow, B is the size of the queue buffer is bytes, and $\alpha$ is a method parameter for determination of the total number of tokens in the system ($\alpha$>0).

At step 630, the rate of token allocation to each bucket is adjusted according to the formula $R_i=w_i(\beta C)$, where $R_i$ is the rate at which tokens are added to the i-th bucket, $w_i$ is the normalised weight of the i-th active dataflow, C is the outgoing link bandwidth in bytes per second, and $\beta$ is a method parameter which determines the rate at which tokens are added to the system ($\beta$>0).

At step 640, the tokens from the full bucket corresponding to the inactive dataflow are redistributed to the other remaining buckets and the bucket corresponding to the inactive dataflow is deleted. In this way, available tokens can be fairly distributed amongst all the remaining buckets. The heights of the remaining buckets are also increased . Processing then reverts to step 500 of FIG. 5.

SFED with Aggregate Dataflows

The provision of differentiated services to a group of dataflows in the Internet is further possible. Dataflows with similar properties and/or requirements are aggregated and treated as a single dataflow. In the SFED methodology, multiple dataflows of similar properties are aggregated as a single dataflow and are weighted according to the common properties and/or requirements of the group. Such a group of dataflows, aggregated as a single dataflow, has a single token bucket. For dataflows in one aggregate, the SFED methodology behaves much like the RED methodology.

Aggregation can be implemented in different ways. One way to aggregate dataflows is according to the nature of the traffic carried. At a particular gateway, all streaming audio and UDP connections can be aggregated into one dataflow, all FTP, HTTP and web traffic in another, and all telnet, rlogin and similar interactive traffic in yet another separate dataflow. By assigning weights of 25, 40 and 35, respectively, CBR and streaming traffic can be assured of 25%, adaptive web traffic can be assured of 40%, and interactive sessions can be assured of 35% of the bandwidth of the outgoing link, respectively.

Another way to aggregate traffic is to accumulate dataflows coming from an incoming link as a single dataflow and guarantee the incoming link a fixed bandwidth, perhaps in accordance with a performance contract. Obviously, this requires the setting of appropriate weights to each incoming link in proportion to the bandwidth agreed upon.

SFED with Hierarchical Dataflows

A further common requirement at gateways is the accomodation of hierarchical dataflows (i.e. multiple levels of dataflow distinction). As an example dataflows may need to be distinguished firstly on the basis of traffic content and then, according to each kind of traffic, on the basis of different source and destination IP addresses.

Such a scenario requires a two level hierarchy for distinguishing dataflows and is easily implementable using the SFED methodology. In such a hierarchical tree of dataflow classification, a token bucket is assigned to each of the different leaves of the tree. The normalized weight of each token bucket is the product of the normalized weights moving down the hierarchical tree. A key feature is that the redistribution of tokens and the adjustment of bucket heights moves upwards from the leaves to the root of the hierarchical tree. The first level of redistribution of tokens is at the current level (ie amongst siblings). Then, overflow of tokens from the current sub-tree spills over to sibling sub-trees in the hierarchy and so on.

A Case Study

Figure 7:
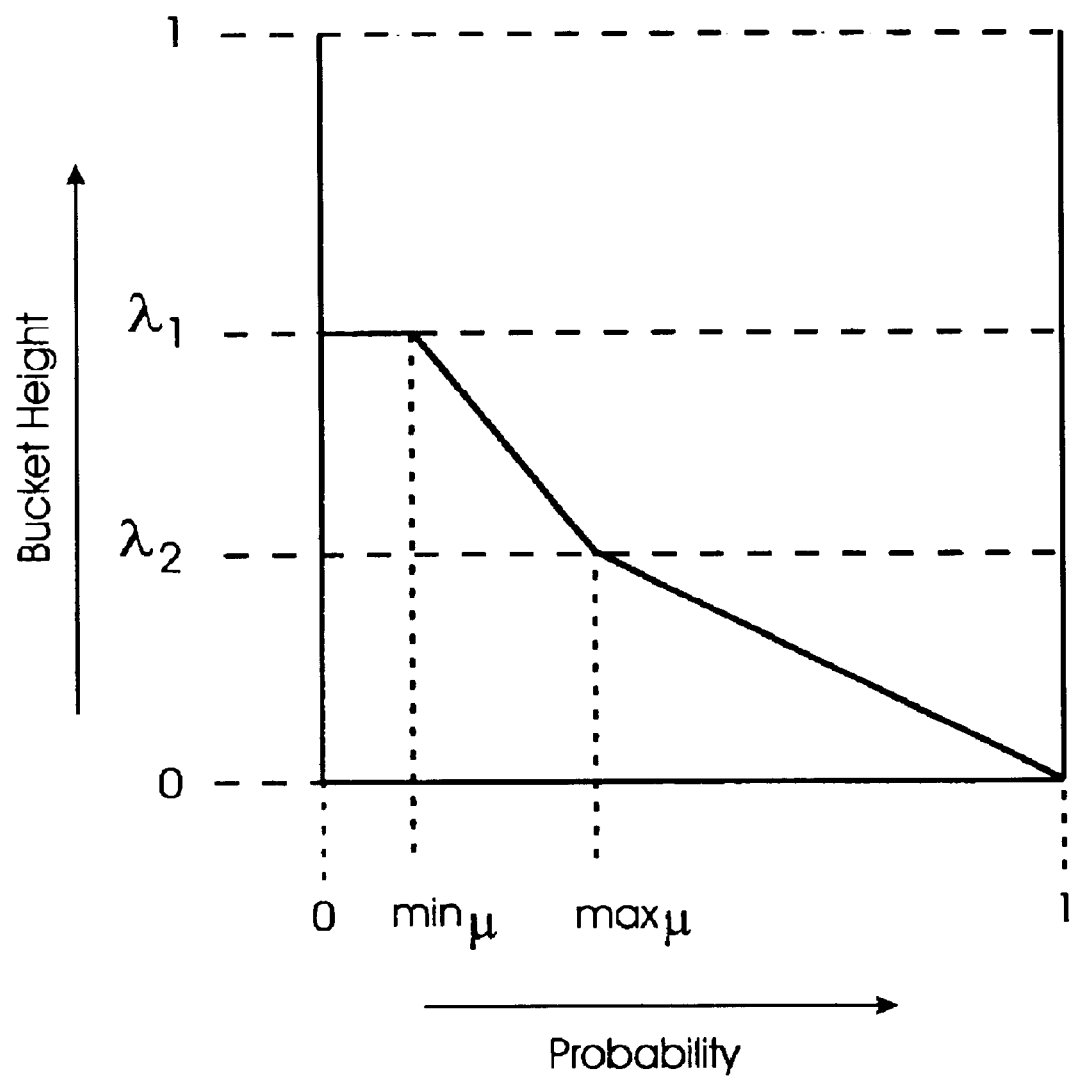
FIG. 7 is a sample probability profile according to which packets are dropped in the SFED algorithm.

A case study is presented in which the various queue management methodologies of RED, FRED, BRED and SFED are compared according to a simulated scenario. For the sake of simplicity, all incoming dataflows are assumed to be equally weighted and the RED probability profile, as shown in FIG. 7, is applied.

The value of the method parameters are as follows:

$\alpha=1$ $\beta=1$ $\Gamma=\{g_1, g_2 \ldots g_N\}=1$ (ie $g_i=1$, for all i)

$H_{min}=0$ bytes

SFED requires a very simple implementation since perflow usage history is maintained without any queue averaging, as is done in the case of RED and FRED. Consequently, SFED can be implemented with minimal floating point operations. Since all incoming dataflow weights are equal, the only per-flow status that needs to be maintained is the current occupancy of each bucket $x_i$ which can be realised using a single register.

Further, since all weights and heights are equal, the rate at which tokens are added to each bucket is $R_i=C/N$ for all i and the height of each bucket $L_i=B/N$ for all i.

The global parameters that need to be maintained are $max_p$, $min_p$, $\lambda_1$, $\lambda_2$ and N. Referring to FIG. 7, $\lambda_1$ corresponds to the fractional occupancy of a bucket above which there are no packet drops, $\lambda_2$ corresponds to the fractional occupancy of a bucket below which the probability of packet dropping rises sharply, $min_p$ is the probability of packet drop at fractional occupancy $\lambda_1$, and $max_p$ is the probability of packet drop at fractional occupancy $\lambda_2$. N is the total number of active flows at a given instant and B is the cumulative size of all buckets. Accordingly, the size of a bucket is B/N when there are N flows.

The only per-flow parameter that needs to be maintained is $x_i$. The rate of addition of tokens into the system, C, can be implemented using a single counter, and the tokens may be distributed into the individual buckets in a round robin fashion. By scaling the probability function to some appropriate value, say $10^6$, the drop probability can be calculated using integer operations. Hence, no floating point operations are necessary, which results in minimal complexity of the algorithm.

Figure 8:
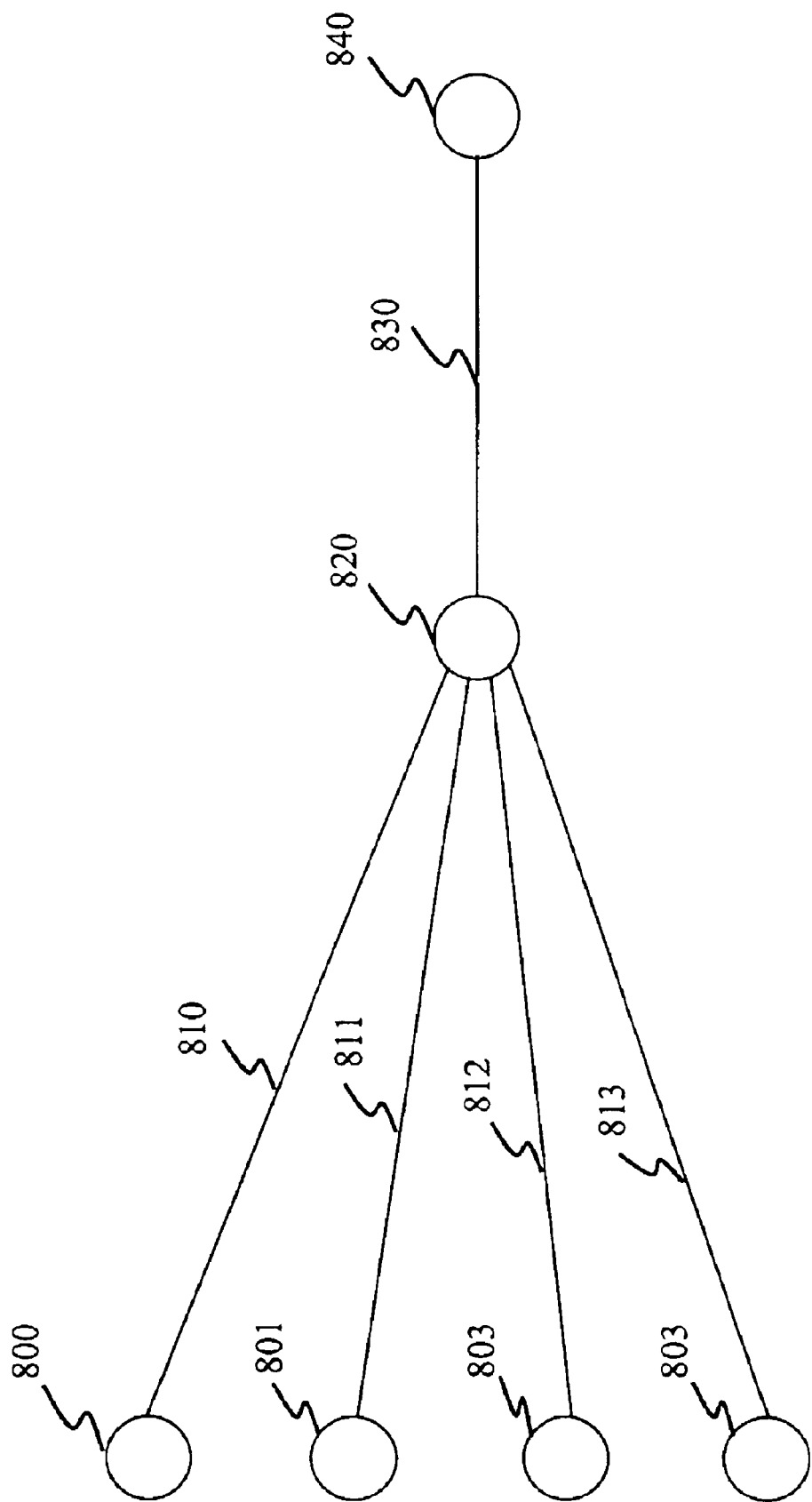
FIG. 8 is a block diagram illustrating a simulation scenario for comparison of different queue management methodologies/algorithms.
Figure 9:
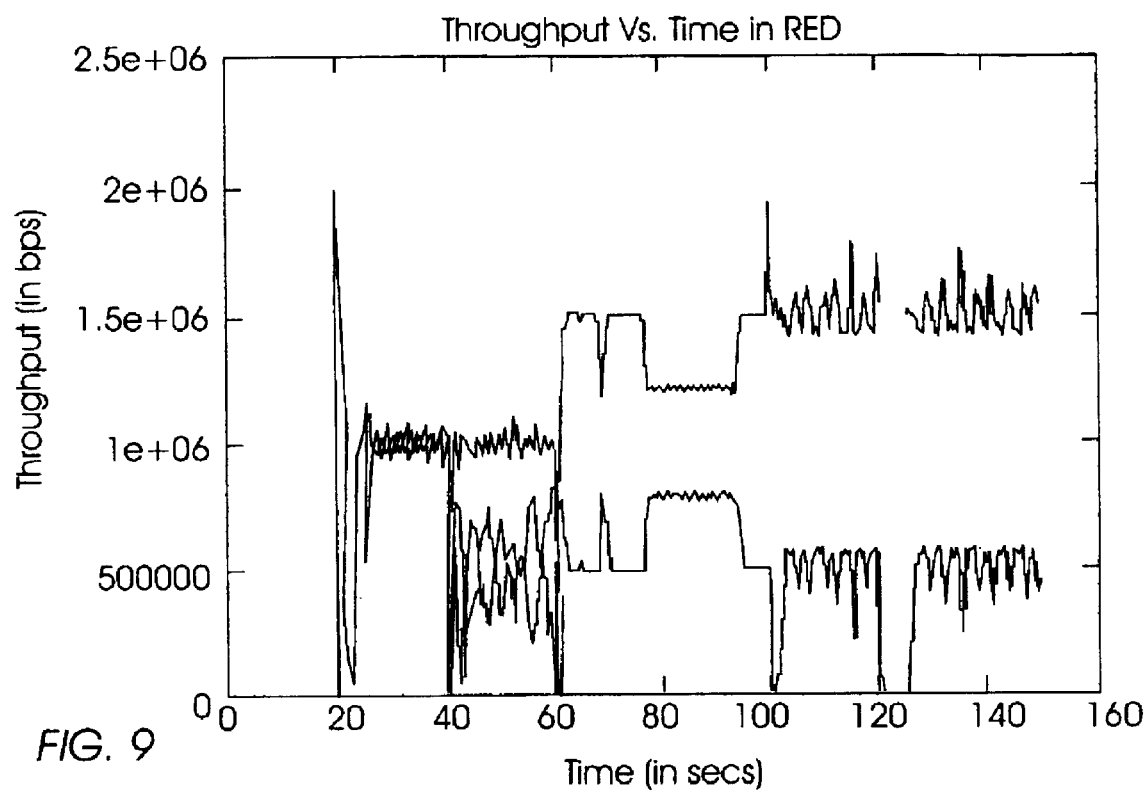
FIG. 9 is a graph illustrating throughput for the simulation scenario of FIG. 8 when the RED algorithm is applied.
Figure 10:
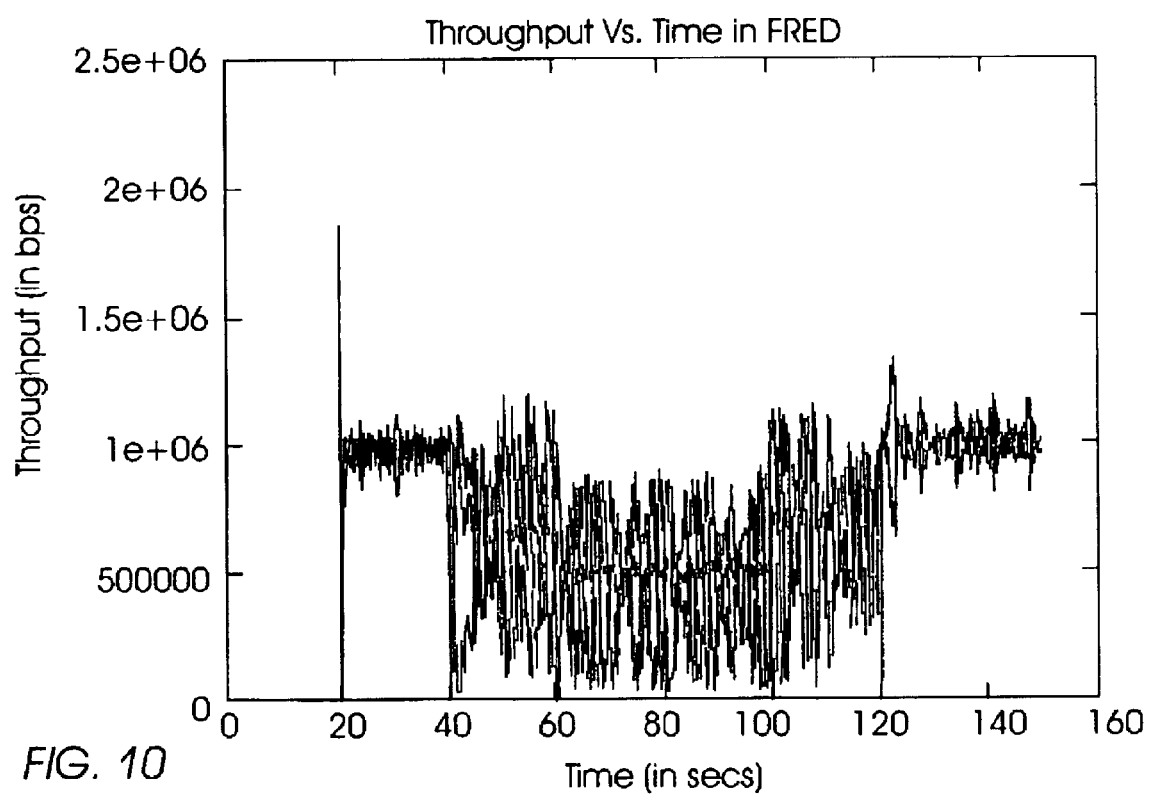
FIG. 10 is a graph illustrating throughput for the simulation scenario of FIG. 8 when the FRED algorithm is applied.
Figure 11:
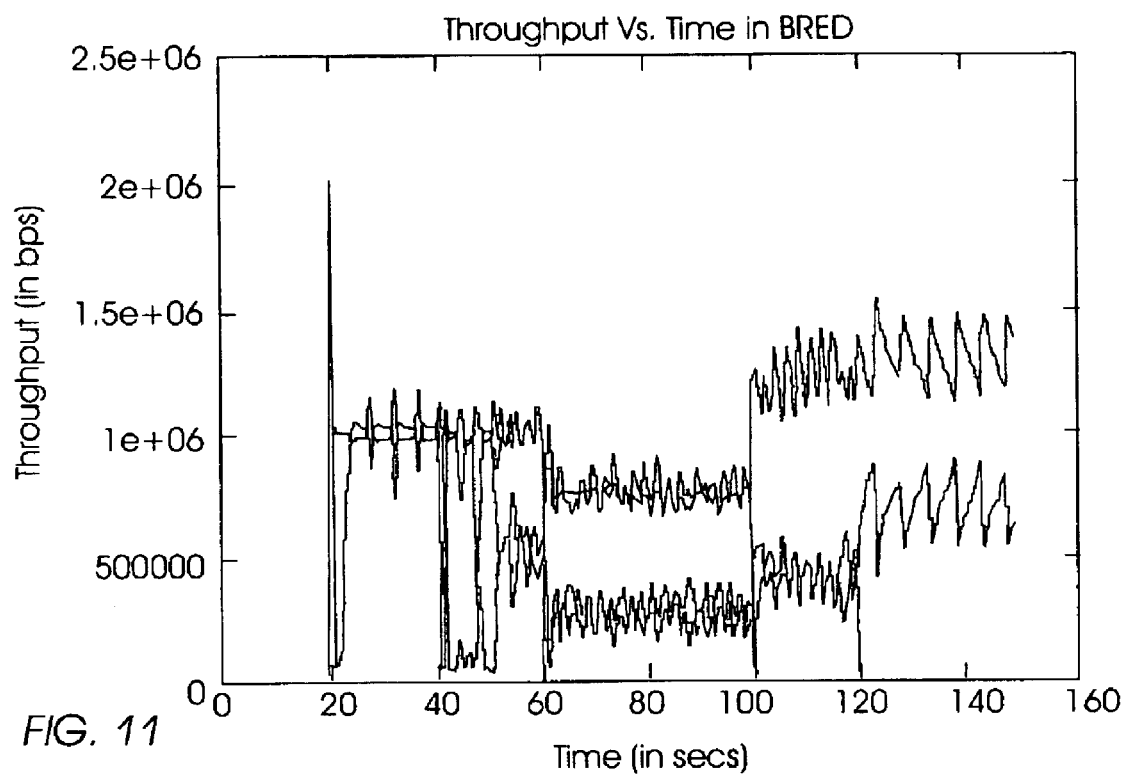
FIG. 11 is a graph illustrating throughput for the simulation scenario of FIG. 8 when the BRED algorithm is applied.

FIG. 8 shows a gateway 820 that receives incoming dataflows 810 to 813 from sources 800 to 801, respectively. Sources 800 and 801 are adaptive TCP sources while sources 802 and 803 are non-adaptive CBR sources. TCP source 800 starts sending at time $T_{st1}=0$ seconds and stops sending at time $T_{sp1}=120$ seconds. TCP source 801 starts sending at time $T_{st2}=40$ seconds and stops sending at time $T_{sp2}=150$ seconds. 1 Mbps CBR source 802 starts sending at time $T_{st3}=20$ seconds and stops sending at time $T_{sp3}=100$ seconds. 1.5 Mbps CBR source 803 starts sending at time $T_{st4}=60$ seconds and stops sending at time $T_{sp4}=150$ seconds. Incoming dataflows 810 to 813 are all of rate 100 Mbps and of duration 5 ms. The outgoing link 830 from the gateway 820 to a remote location 840 is of rate 2 Mbps and of duration 5 ms.

The values of the parameters selected for simulation of each of the queue management methodologies are as follows:

| RED : | Buffer size = | 48 Kbytes |
|---|---|---|
| | $min_{th}$ = | 12 Kbytes |
| | $max_{th}$ = | 24 Kbytes |
| | $max_p$ = | 0.02 |
| | $w_q$ = | 0.02 |
| FRED : | Buffer size = | 48 Kbytes |
| | $min_{th}$ = | 12 Kbytes |
| | $max_{th}$ = | 24 Kbytes |
| | $max_p$ = | 0.02 |
| | $w_q$ = | 0.02 |
| | $min_q$ = | 2 packets |
| BRED : | Buffer size = | 48 Kbytes |
| | a = | 0.9 |
| | b = | 1.3 |
| SFED : | Buffer size = | 48 Kbytes |
| | $\alpha$ = | 1 |
| | $\beta$ = | 1 |
| | $g_i$ for i = 1, 2, 3, 4 = | 1 |
| | $f_p$:[0, 1]→[0, 1] = | As given in [FIG. 7], where: |
| | | $min_p = 0$ |
| | | $max_p = 0.02$ |
| | | $\lambda_1 = 0.66$ |
| | | $\lambda_2 = 0.33$ |
| | | $H_{min} = 0$ |

Figure 12:
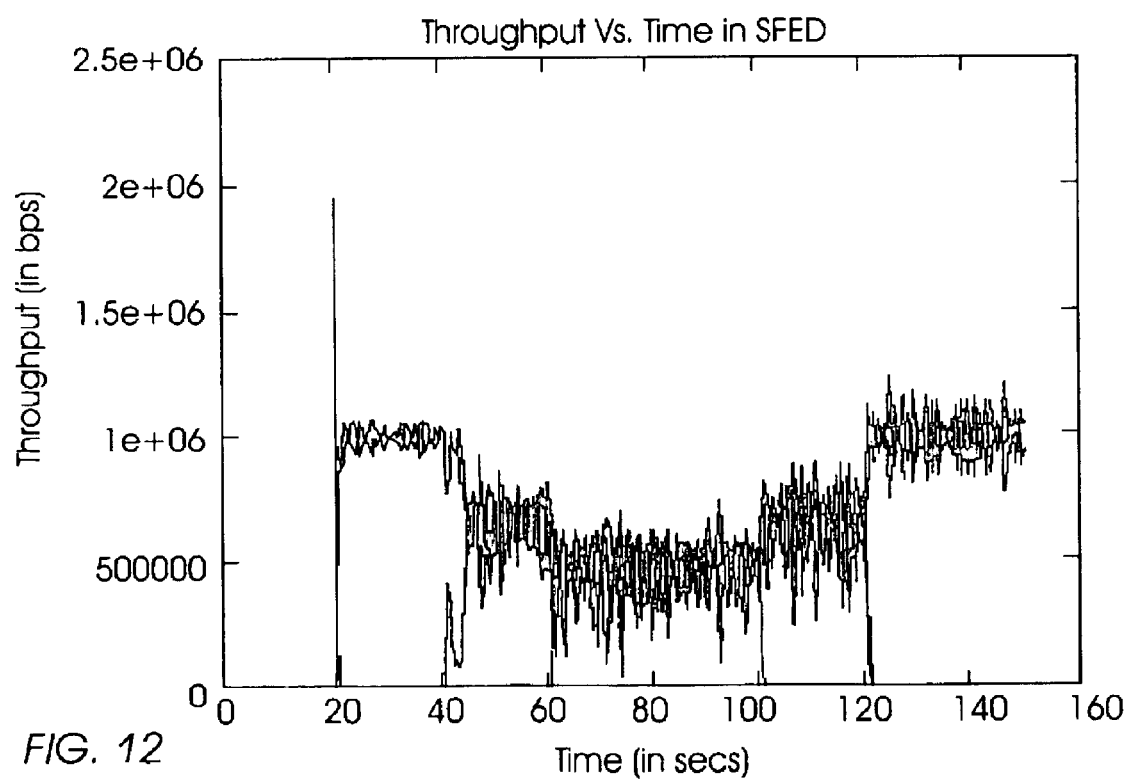
FIG. 12 is a graph illustrating throughput for the simulation scenario of FIG. 8 when the SFED algorithm is applied.
Figure 13:
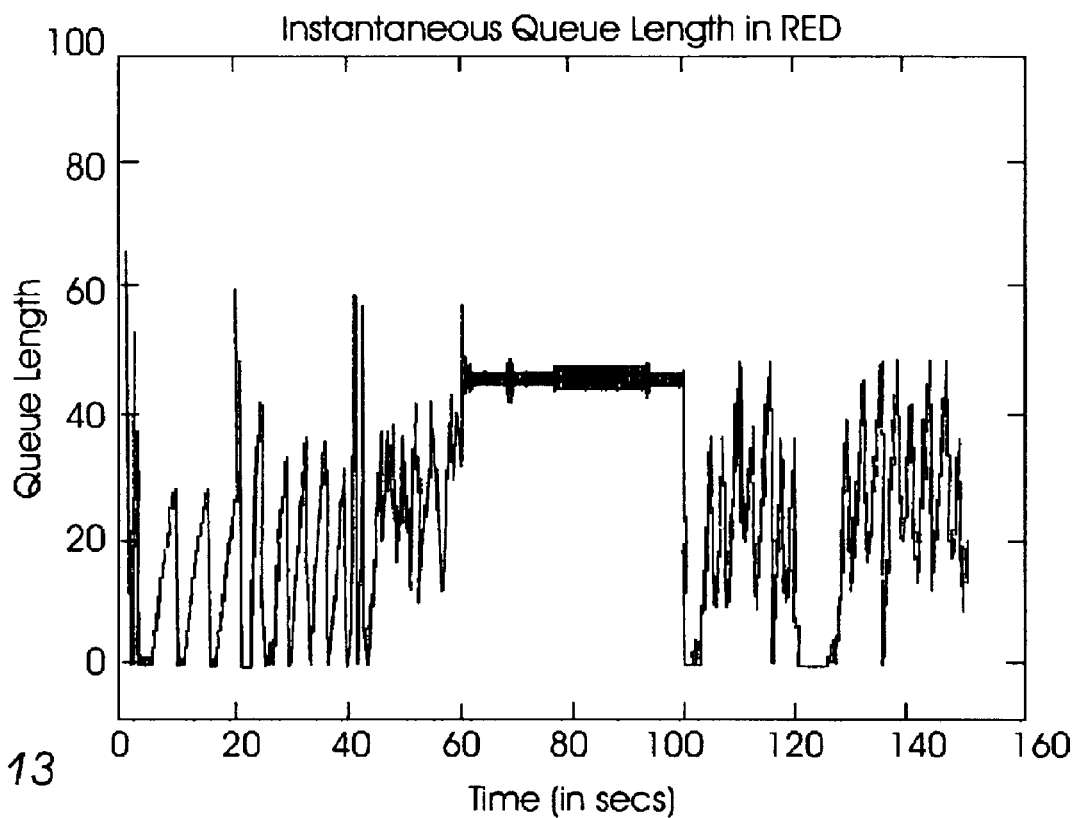
FIG. 13 is a graph illustrating instantaneous queue occupancy for the simulation scenario of FIG. 8 when the RED algorithm is applied.
Figure 14:
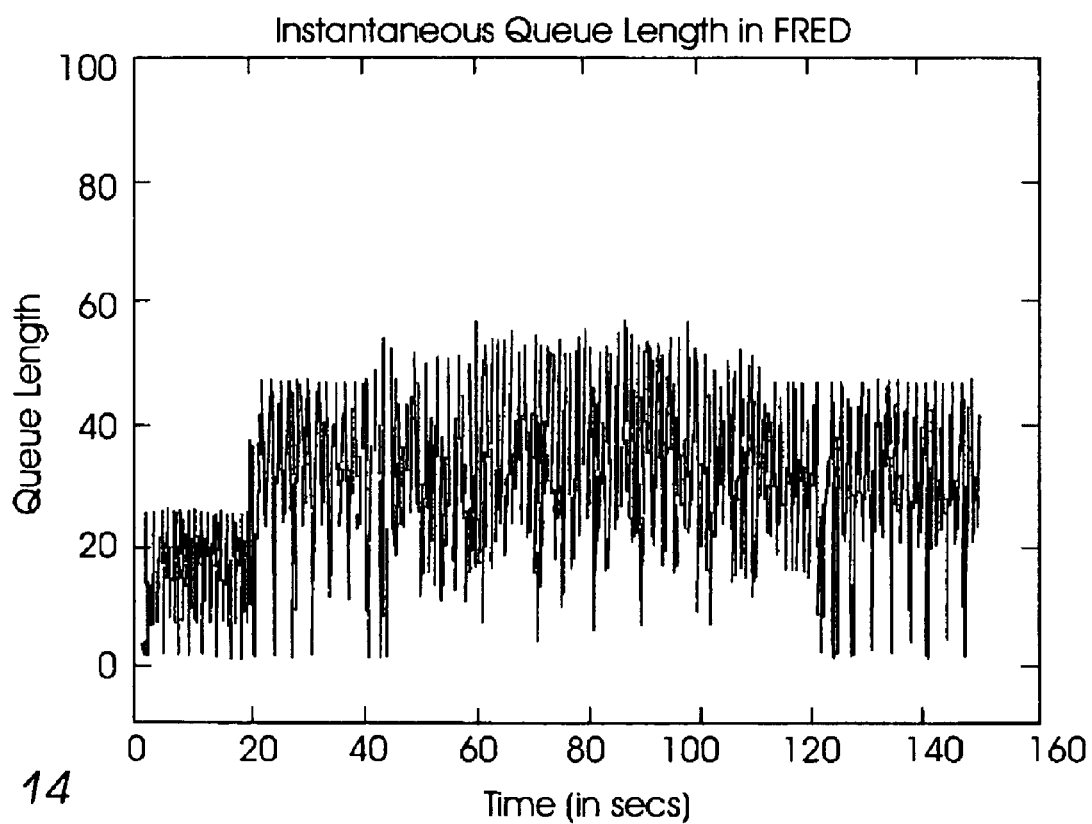
FIG. 14 is a graph illustrating instantaneous queue occupancy for the simulation scenario of FIG. 8 when the FRED algorithm is applied.
Figure 15:
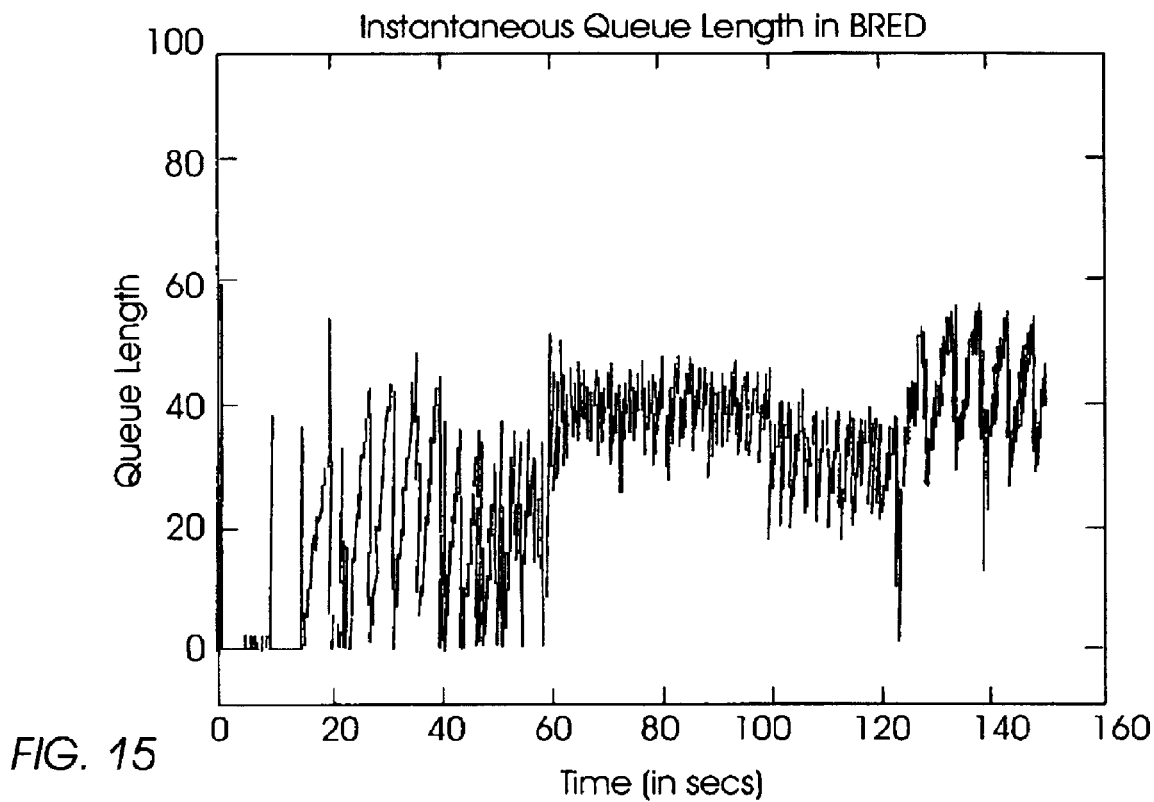
FIG. 15 is a graph illustrating instantaneous queue occupancy for the simulation in scenario of FIG. 8 when the BRED algorithm is applied.

The results of the simulations are presented in FIGS. 9 to 16. The throughput of the various incoming dataflows 810 to 813, as the number of dataflows is increased, and the total throughput is shown in FIGS. 9 to 12 for the queue management methodologies RED, FRED, BRED and SFED, respectively. Throughput for each incoming dataflow provides a measure of fairness of bandwidth allocation amongst the different dataflows and the overall throughput provides a measure of link utilisation achieved. Since all dataflows are considered equal, all active dataflows should receive an equal share of bandwidth at any point of time. It can be clearly seen from the FIGS. 9 and 11 that the RED and BRED methodologies fail to achieve fairness. The FRED methodology of FIG. 10 achieves fairness to an extent but exhibits relatively more fluctuations. The SFED methodology of FIG. 12 provides maximum fairness with least fluctuations from the ideal case.

Figure 16:
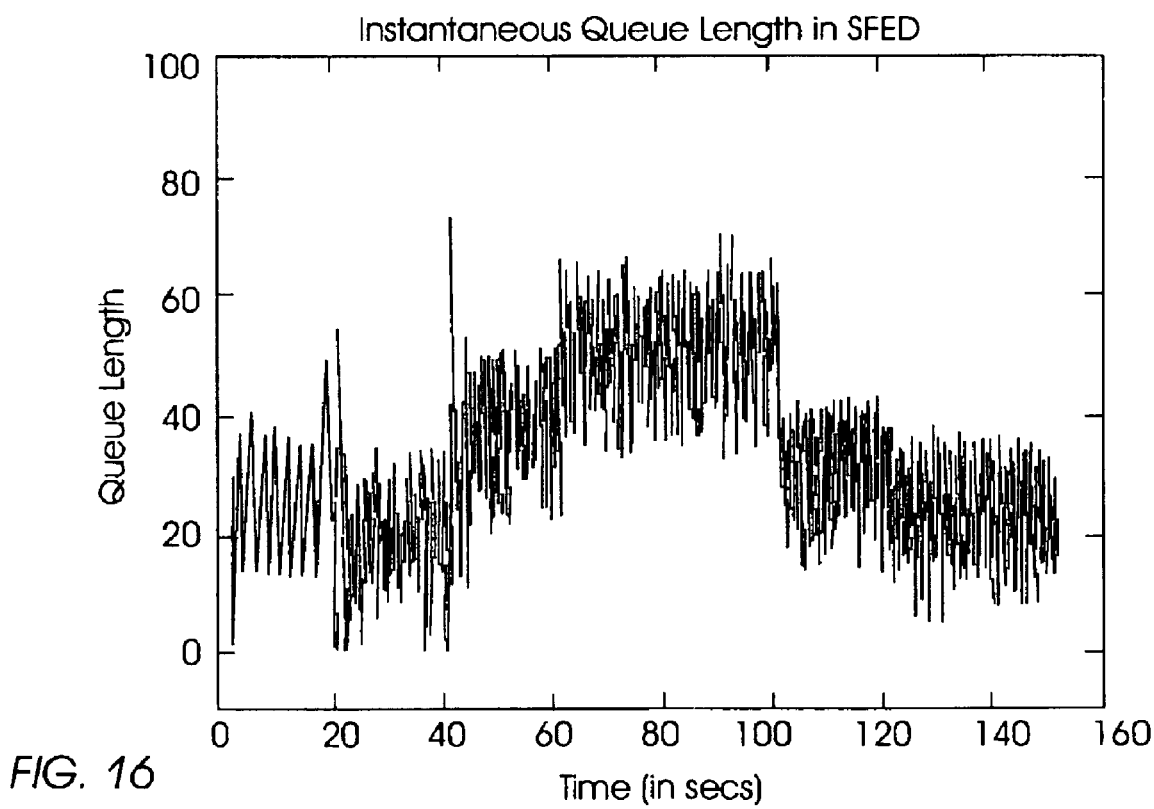
FIG. 16 is a graph illustrating instantaneous queue occupancy for the simulation scenario of FIG. 8 when the SFED algorithm is applied.

FIGS. 13 to 16 show the queue length for each of the queue management methodologies RED, FRED, BRED and SFED, respectively. Queue length corresponds to instantaneous queue occupancy and provides an estimate of the queuing delay seen at the gateway by each packet. A nearly full queue indicates a greater number of tail drops from the queue and congestion in the network. Very low queue lengths indicate low link utilization. As seen in FIG. 16, the queue occupancy in the SFED methodology varies in accordance with the number of dataflows (i.e. the packet flow into the system). This enables the achievement of better fairness (e.g. in FRED of FIG. 14, the queue occupancy is invariant to the packet inflow and thus results in more drops when the incoming rates are higher).

Computer Implementation

Figure 17:
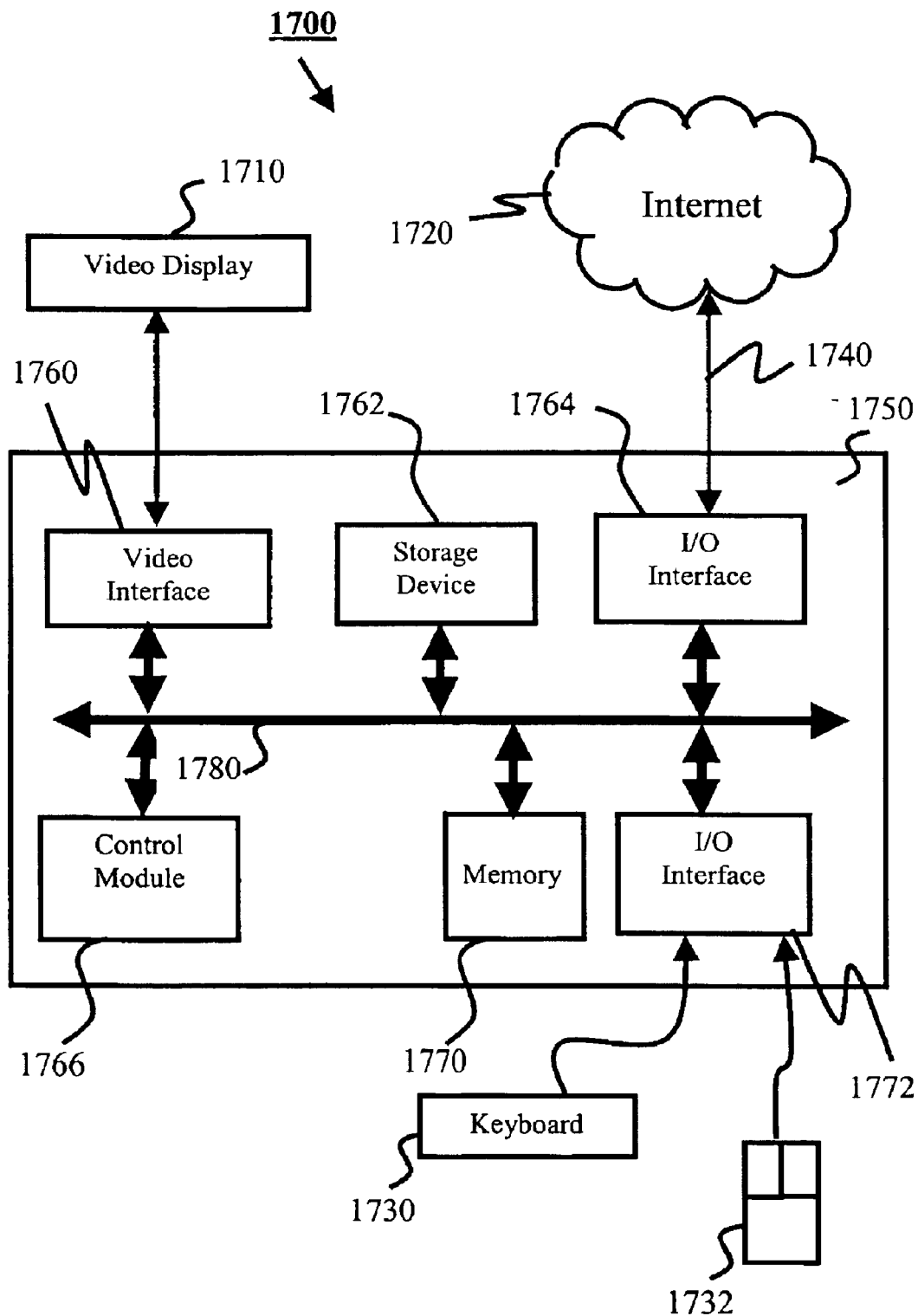
FIG. 17 is a block diagram of a computer system on which software or computer readable program code for allocation of bandwidth to dataflows can be executed.

The method for allocation of bandwidth to dataflows can be implemented using a computer program product in conjunction with a computer system 1700 as shown in FIG. 17. In particular, the allocation of bandwidth to dataflows can be implemented as software, or computer readable program code, executing on the computer system 1700.

The computer system 1700 includes a computer 1750, a video display 1710, and input devices 1730, 1732. In addition, the computer system 1700 can have any of a number of other output devices including line printers, laser printers, plotters, and other reproduction devices connected to the computer 1750. The computer system 1700 can be connected to one or more other computers via a communication input/output (I/O) interface 1764 using an appropriate communication channel 1740 such as a modem communications path, an electronic network, or the like. The network may include a local area network (LAN), a wide area network (WAN), an Internet, and/or the Internet 1720.

The computer 1750 includes the control module 1766, a memory 1770 that may include random access memory (RAM) and read-only memory (ROM), input/output (I/O) interfaces 1764, 1772, a video interface 1760, and one or more storage devices generally represented by the storage device 1762. The control module 1766 is implemented using a central processing unit (CPU) that executes or runs a computer readable program code that performs a particular function or related set of functions.

The video interface 1760 is connected to the video display 1710 and provides video signals from the computer 1750 for display on the video display 1710. User input to operate the computer 1750 can be provided by one or more of the input devices 1730, 1732 via the I/O interface 1772. For example, a user of the computer 1750 can use a keyboard as I/O interface 1730 and/or a pointing device such as a mouse as I/O interface 1732. The keyboard and the mouse provide input to the computer 1750. The storage device 1762 can consist of one or more of the following: a floppy disk, a hard disk drive, a magneto-optical disk drive, CD-ROM, magnetic tape or any other of a number of non-volatile storage devices well known to those skilled in the art. Each of the elements in the computer system 1750 is typically connected to other devices via a bus 1780 that in turn can consist of data, address, and control buses.

The method steps for allocation of bandwidth to dataflows are effected by instructions in the software that are carried out by the computer system 1700. Again, the software may be implemented as one or more modules for implementing the method steps.

In particular, the software may be stored in a computer readable medium, including the storage device 1762 or that is downloaded from a remote location via the interface 1764 and communications channel 1740 from the Internet 1720 or another network location or site. The computer system 1700 includes the computer readable medium having such software or program code recorded such that instructions of the software or the program code can be carried out.

The computer system 1700 is provided for illustrative purposes and other configurations can be employed without departing from the scope and spirit of the invention. The foregoing is merely an example of the types of computers or computer systems with which the embodiments of the invention may be practised. Typically, the processes of the embodiments are resident as software or a computer readable program code recorded on a hard disk drive as the computer readable medium, and read and controlled using the control module 1766. Intermediate storage of the program code and any data including entities, tickets, and the like may be accomplished using the memory 1770, possibly in concert with the storage device 1762.

In some instances, the program may be supplied to the user encoded on a CD-ROM or a floppy disk (both generally depicted by the storage device 1762), or alternatively could be read by the user from the network via a modem device connected to the computer 1750. Still further, the computer system 1700 can load the software from other computer readable media. This may include magnetic tape, a ROM or integrated circuit, a magneto-optical disk, a radio or infrared transmission channel between the computer and another device, a computer readable card such as a PCMCIA card, and the Internet 1720 and Intranets including email transmissions and information recorded on Internet sites and the like. The foregoing are merely examples of relevant computer readable media. Other computer readable media may be practised without departing from the scope and spirit of the invention.

The allocation of bandwidth to dataflows can be realised in a centralised fashion in one computer system 1700, or in a distributed fashion where different elements are spread across several interconnected computer systems.

Computer program module or computer program in the present context means any expression, in any language, code or notation, of a set of instructions intended to cause a system having an information processing capability to perform a particular function either directly or after either or both of the following: a) conversion to another language, code or notation or b) reproduction in a different material form.

In the foregoing manner, a method, a system, and a computer program product for allocation of bandwidth to dataflows are disclosed. While only a small number of embodiments are described, it will be apparent to those skilled in the art in view of this disclosure that numerous changes and/or modifications can be made without departing from the scope and spirit of the invention.

We claim:

1. A method of allocating bandwidth of a limited bandwidth link among dataflows comprising packets, said method comprising:

adaptively adjusting a number of buckets dependent upon a number of active dataflows of said dataflows, wherein each bucket comprises a number of tokens allocated to said bucket for use by a corresponding dataflow of said active dataflows, said number of tokens dependent upon a weighted value of said corresponding dataflow, wherein queuing of said packets for utilization of said limited bandwidth link is dependent upon said number of tokens; and adaptively reallocating said tokens among said buckets in accordance with a weighted value of each of said dataflows, wherein each said bucket is operable for maintaining a record of past usage of an outgoing bandwidth link by each dataflow of said dataflows, wherein each said bucket comprises a height proportional to weights of respective said dataflows, wherein said height of each said bucket determines a maximum size of bursts of said dataflows that can be accommodated by said buckets, and wherein an allocation rate at which the number of tokens of a predetermined number of tokens of said dataflows are allocated to said buckets is proportional to said weights of respective said dataflows so that a cumulative rate of all the allocation rates equals a fixed transmission capacity of said bandwidth link.

2. The method of claim 1, wherein said adaptively adjusting further comprises creating an additional bucket for each additional dataflow, wherein a token-carrying capacity of said additional bucket is dependent upon a weighted value for said additional dataflow and said additional bucket is initially filled with tokens.

3. The method of claim 1, wherein the adaptive adjusting step further includes the step of deleting a bucket when the dataflow corresponding to that bucket becomes inactive.

4. The method of claim 3, further comprising distributing the tokens from the deleted bucket amongst one or more of the other remaining buckets.

5. The method of claim 1, further comprising:

queuing one or more packets of a dataflow for utilization of said limited bandwidth link;

removing a number of tokens from the bucket corresponding to said dataflow, wherein said number of tokens is dependent upon the size of said one or more packets; and making said number of tokens available for reallocation.

6. The method of claim 5, further comprising dropping one or more received packets of a dataflow when the bucket corresponding to said dataflow has insufficient tokens for queuing of said one or more packets.

7. The method of claim 5, further comprising of queuing received packets of diverse dataflows in a single queue.

8. The method of claim 1 or claim 2, wherein two or more of said dataflows comprise heterogeneous dataflows.

9. The method of claim 1 or claim 2, further comprising aggregating and treating two or more of said dataflows as a single dataflow.

10. The method of claim 1 or claim 2, wherein one or more of said dataflows comprise hierarchical dataflows and each level of an hierarchical dataflow is treated as a single dataflow.

11. The method of claim 1, wherein a total number of said tokens is conserved.

12. The method of claim 1, wherein a rate of transmission of said packets across said limited bandwidth link is unaffected by an application of said method.

13. A system for allocating bandwidth of a limited bandwidth link among dataflows comprising packets, said system comprising:

means for adaptively adjusting a number of buckets dependent upon a number of active dataflows of said dataflows, wherein each bucket comprises a number of tokens allocated to said bucket for use by a corresponding dataflow of said active dataflows, said number of tokens dependent upon a weighted value of said corresponding dataflow, wherein queuing of said packets for utilization of said limited bandwidth link is dependent upon said number of tokens; and means for adaptively reallocating said tokens among said buckets in accordance with a weighted value of each of said dataflows, wherein each said bucket is operable for maintaining a record of past usage of an outgoing bandwidth link by each dataflow of said dataflows, wherein each said bucket comprises a height proportional to weights of respective said dataflows, wherein said height of each said bucket determines a maximum size of bursts of said dataflows that can be accommodated by said buckets, and wherein an allocation rate at which the number of tokens of a predetermined number of tokens of said dataflows are allocated to said buckets is proportional to said weights of respective said dataflows so that a cumulative rate of all the allocation rates equals a fixed transmission capacity of said bandwidth link.

14. The system of claim 13, wherein the means for adaptively adjusting comprises means for creating an additional bucket for each additional dataflow, wherein a token-carrying capacity of said additional bucket is dependent upon a weighted value for said additional dataflow and said additional bucket is initially filled with tokens.

15. The system of claim 13, wherein the means for adaptively adjusting further includes menus for deleting a bucket when the dataflow corresponding to that bucket becomes inactive.

16. The system of claim 15, further including means for distributing the tokens from the deleted bucket amongst one or more of the other remaining buckets.

17. The system of claim 13, further including:
means for queueing one or more packets of a dataflow for utilization of said limited bandwidth link;
means for removing a number of tokens from the bucket corresponding to said dataflow, wherein said number of tokens is dependent upon the size of said one or more packets; and
means for making said number of tokens available for reallocation.

18. The system of claim 17, further including means for dropping one or more received packets of a dataflow when the bucket corresponding to said dataflow has insufficient tokens for queuing of said one or more packets.

19. The system of claim 17, further including means for queuing received packets of diverse dataflows in a single queue.

20. The system of claim 13 or claim 14, wherein two or more of said dataflows comprise heterogeneous dataflows.

21. The system of claim 13 or claim 14, further including means for aggregating and treating two or more of said dataflows as a single dataflow.

22. The system of claim 13 or claim 14, wherein one or more of said dataflows comprise hierarchical dataflows and each level of an hierarchical dataflow is treated as a single dataflow.

23. The system of claim 13, wherein a total number of said tokens is conserved.

24. The system of claim 13, wherein a rate of transmission of said packets across said limited bandwidth link is unaffected by an application of said system.

25. A computer program product including a computer readable medium with a computer program recorded therein for allocating bandwidth of a limited bandwidth link among dataflows comprising packets, said computer program product comprising:
means for adaptively adjusting a number of buckets dependent upon a number of active dataflows of said dataflows, wherein each bucket comprises a number of tokens allocated to said bucket for use by a corresponding dataflow of said active dataflows, said number of tokens dependent upon a weighted value of said corresponding dataflow, wherein queuing of said packets for utilization of said limited bandwidth link is dependent upon said number of tokens; and
means for adaptively reallocating said tokens among said buckets in accordance with a weighted value of each of said dataflows, wherein each said bucket is operable for maintaining a record of past usage of an outgoing bandwidth link by each dataflow of said dataflows, wherein each said bucket comprises a height proportional to weights of respective said dataflows, wherein said height of each said bucket determines a maximum size of bursts of said dataflows that can be accommodated by said buckets, and wherein an allocation rate at which the number of tokens of a predetermined number of tokens of said dataflows are allocated to said buckets is proportional to said weights of respective said dataflows so that a cumulative rate of all the allocation rates equals a fixed transmission capacity of said bandwidth link.

26. The computer program product of claim 25, wherein said computer program code means for adaptively adjusting comprises computer program code means for creating an additional bucket for each additional dataflow, wherein a token-carrying capacity of said additional bucket is dependent upon a weighted value for said additional dataflow and said additional bucket is initially filled with tokens.

27. The computer program product of claim 25, wherein the computer program code means for adaptively adjusting further includes computer program code means for deleting a bucket when the dataflow corresponding to that bucket becomes inactive.

28. The computer program product of claim 27, further including computer program code means for distributing the tokens from the deleted bucket amongst one or more of the other remaining buckets.

29. The computer program product of claim 25, further including:
computer program code means for queuing one or more packets of a dataflow for utilization of said limited bandwidth link;
computer program code means for removing a number of tokens from the bucket corresponding to said dataflow, wherein said number of tokens is dependent upon the size of said one or more packets; and
computer program code means for making said number of tokens available for reallocation.

30. The computer program product of claim 29, further including computer program code means for dropping one or more received packets of a dataflow when the bucket corresponding to said dataflow has insufficient tokens for queueing of said one or more packets.

31. The computer program product of claim 29, further including computer program code means for queuing received packets of diverse dataflows in a single queue.

32. The computer program product of claim 25 or claim 26, wherein two or more of said dataflows comprise heterogeneous dataflows.

33. The computer program product of claim 25 or claim 26, further including computer program code means for aggregating and treating two or more of said dataflows as a single dataflow.

34. The computer program product of claim 25 or claim 26, wherein one or more of said dataflows comprise hierarchical dataflows and each level of an hierarchical dataflow is treated as a single dataflow.

35. The computer program product of claim 25, wherein a total number of said tokens is conserved.

36. The computer program product of claim 25, wherein a rate of transmission of said packets across said limited bandwidth link is unaffected by an application of said computer program product.

* * * * *